United States Patent [19]

Hsien

[11] Patent Number: 5,700,194
[45] Date of Patent: Dec. 23, 1997

[54] JOYPAD CIRCUIT FOR PLAYING PC GAMES

[76] Inventor: Ming-kun Hsien, No. 53, Chungcheng Rd., Hsitzu Chen, Taipei Hsien, Taiwan

[21] Appl. No.: 642,862

[22] Filed: May 6, 1996

[51] Int. Cl.[6] .................................................. A63F 9/24
[52] U.S. Cl. ........................................ 463/37; 273/148 B
[58] Field of Search .................................. 463/36, 37, 38, 463/39; 273/148 B; 345/157, 162; 341/21, 22; 340/825.15, 825.19

[56] References Cited

U.S. PATENT DOCUMENTS

| 5,259,626 | 11/1993 | Ho | 463/37 |
| 5,317,505 | 5/1994 | Karabed et al. | 463/37 |
| 5,421,590 | 6/1995 | Robbins | 463/37 |

*Primary Examiner*—Jessica Harrison
*Assistant Examiner*—Michael O'Neill
*Attorney, Agent, or Firm*—Parkhurst, Wendel & Burr, L.L.P.

[57] ABSTRACT

A programmable joypad circuit for playing PC games includes a panel having a plurality of control buttons, a directional button, a switching button, a mode selecting switch, a four/eight direction mode switch, a setting switch and a control circuit having a microprocessor, a memory, a switching circuit, and a parallel/serial conversion circuit. The microprocessor has a plurality of input and output pins respectively coupled with the control buttons, the directional button, the switching button, and mode selecting switch, and setting switch, a data input pin coupled to the PC, a clock pin coupled to the PC, a set pin coupled to said parallel/serial conversion circuit via the direction mode switch, the setting switch, and a control pin coupled to the switch circuit composed of a first transistor and a second transistor each having a collector and an emitter respectively connected to a corresponding data pin and clock pin of the microprocessor and a base connected to a control pin of the microprocessor.

4 Claims, 6 Drawing Sheets

| DEFAULT SET ENTRIES BUTTON | I | II | III | C |
|---|---|---|---|---|
| 11 | ENTER | ENTER | TAB | 1 |
| 12 | ALT-R | SPACE | SHIFT-L | 2 |
| 13 | CTRL-R | ESC | ESC | 3 |
| 14 | ESC | DEL | 1 | 4 |
| 15 | SPACE | DOWN | 2 | 5 |
| 16 | SHIFT-R | SHIFT-R | CTRL-L | 6 |
| 17 | 7 | CTRL-R | ALT-L | 7 |
| UP | 8 | 8 | W | 8 |
| UPPER LEFT | 7 | 7 | Q | 7 |
| DOWN | 2 | 2 | X | 2 |
| LOWER LEFT | 1 | 1 | Z | 1 |
| LEFT | 4 | 4 | A | 4 |
| UPPER RIGHT | 9 | 9 | E | 9 |
| RIGHT | 6 | 6 | D | 6 |
| LOWER RIGHT | 3 | 3 | C | 3 |

FIG. 5

JOYPAD CIRCUIT FOR PLAYING PC GAMES

BACKGROUND OF THE INVENTION

The present invention relates to a joypad for playing a video game, and particularly to a circuit arrangement for playing personal computer games.

In recent years, video games have become a particular favorite entertainment with teenagers and adults. Thus, many apparatuses for playing video games are developed. One of the apparatuses is a personal computer (PC) which receives video game programs stored in storage devices such as floppy disks or CD-ROMs and applies a keyboard to play a video game within the PC. As the keyboard has a great number of keys thereon, it has a considerable size and weight. Accordingly, it is clumsy for a player to use. A joypad circuit for playing PC games is shown in commonly assigned co-pending U.S. Patent application Ser. No. 08/578,075, filed Dec. 27, 1995.

SUMMARY OF THE INVENTION

An objective of the present invention is to provide a joypad circuit for playing PC games.

Another objective of the present invention is to provide a joypad circuit which can cooperate with a plurality of joypad circuits for playing a PC game simultaneously.

According to the present invention, a programmable joypad circuit for playing PC games includes a panel having a plurality of control buttons, a directional button, a switching button, a mode selecting switch, a four/eight direction mode switch, a setting switch and a control circuit having a microprocessor, a memory, a switching circuit, and a parallel/serial conversion circuit, wherein said microprocessor has a plurality of input and output pins respectively coupled with said control buttons, said directional button, said switching button, and mode selecting switch, and setting switch, a data input pin coupled to the PC, a clock pin coupled to the PC, a set pin coupled to said parallel/serial conversion circuit via the directional mode switch, the setting switch, and a control pin coupled to the switch circuit composed of a first transistor and a second transistor each having a collector and an emitter respectively connected to a corresponding data pin and clock pin of the microprocessor and a base connected to a control pin of the microprocessor.

Other objects, advantages, and novel features of the invention will become more apparent from the following detailed description when taken in conjunction with the accompanying drawings.

BRIEF DESCRIPTION OF THE DRAWINGS

FIG. 5 is a table of default entries of the control buttons and the mode selection switch for the joypad circuit of the present invention.

DETAILED DESCRIPTION OF THE PREFERRED EMBODIMENTS

Figure 1:
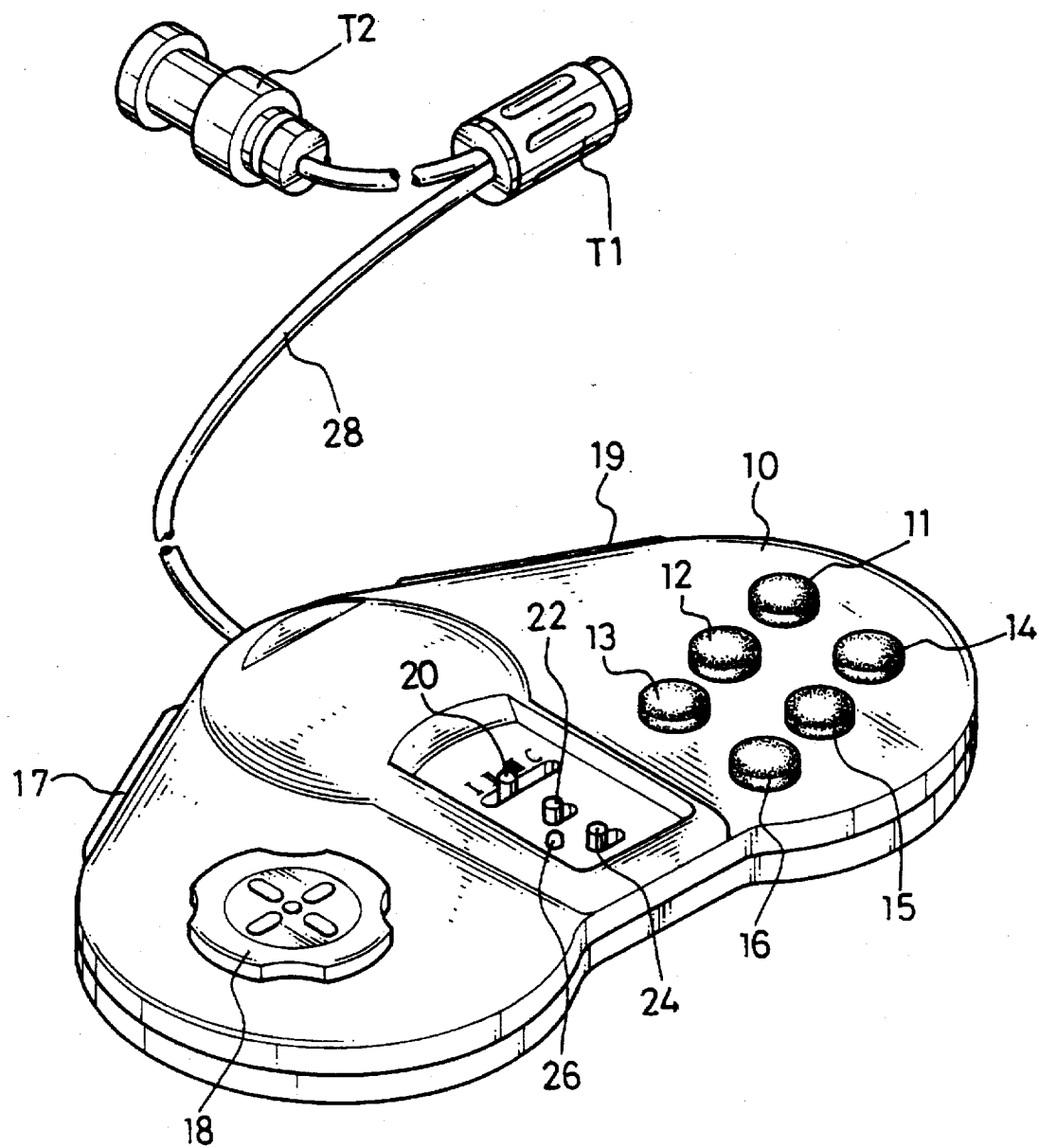
FIG. 1 is a perspective view of a joypad in accordance with the present invention.

Referring to FIG. 1, the joypad 10 for playing PC games includes a plurality of control buttons 11–17, a directional control button 18, a switching key 19, a mode selection switch 20 for selecting a plurality of default entries for the control buttons 11–17 and the directional control button 18, a direction mode switch 22 for selecting whether the directional control button 18 is in a four-direction operation or in an eight-direction operation, a setting switch 24 for performing initial setting of the game, and an LED 26. The default entries for the control buttons 11–17 and the directional control button 18 are shown in FIG. 5. As shown in the table, there are four sets of entries, i.e., I, II, III, and C corresponding to the I, II, III, and C shown in FIG. 1.

Figure 6:
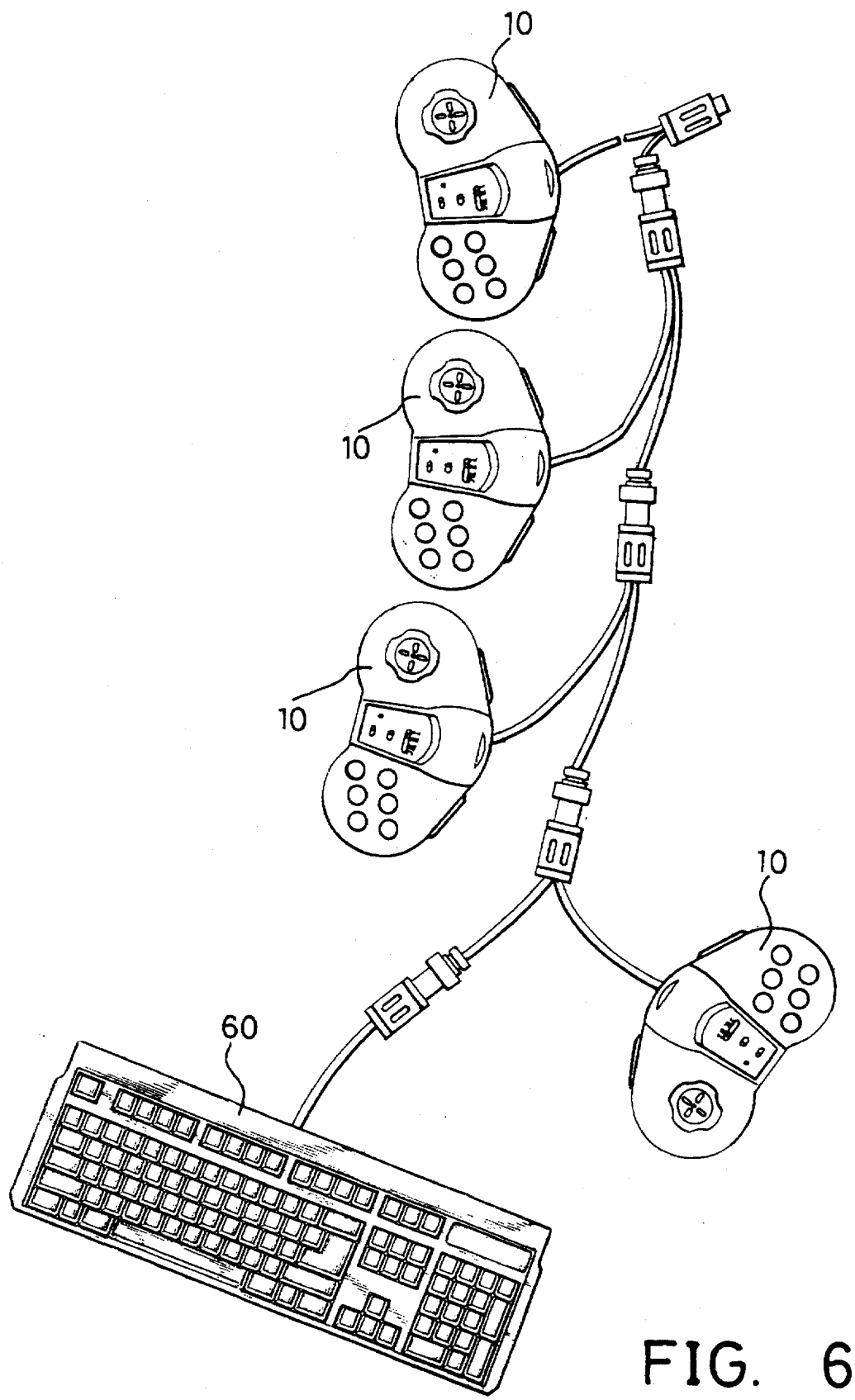
FIG. 6 is a schematic view where four joypads in accordance with the present invention are shown connected.

The joypad 10 has a computer cable 28 with a male connector T1 for optionally connecting to another joypad or a personal computer and a female connector T2 for optionally connecting to a keyboard or another joypad. Referring to FIG. 6, four joypads 10 in accordance with the present invention in corporation with a keyboard 60 are shown. During playing PC games, signals from the keyboard 60 are blocked by a control circuit within the joypads 10 which will generate keyboard-simulating signals to a corresponding PC for playing games.

Figure 2:
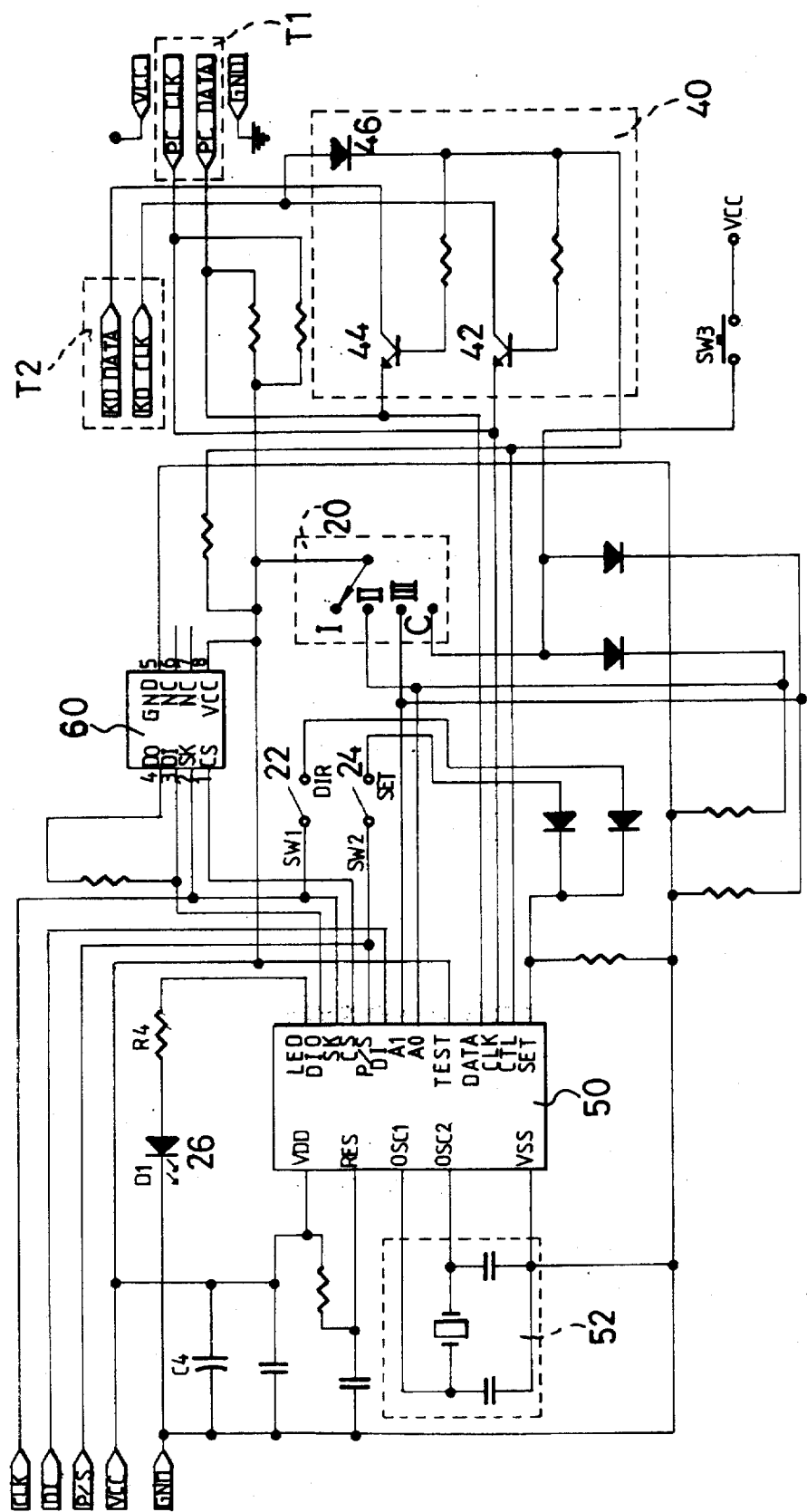
FIGS. 2 and 3 are detailed circuit diagrams for the joypad of the present invention.
Figure 3:
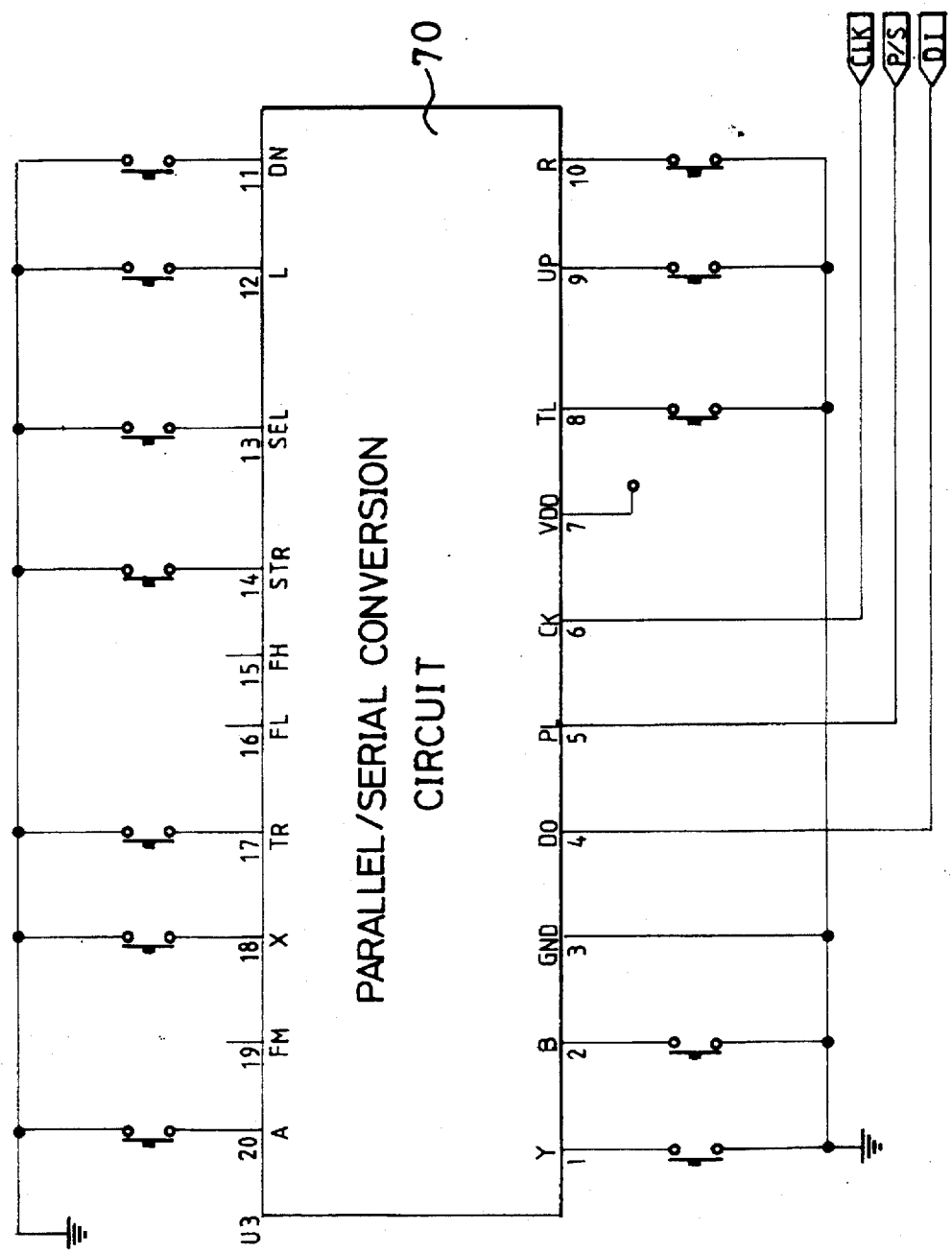

The control circuit within the joypad 10 of the present invention are divided into two circuits respectively shown in FIGS. 2 and 3. The circuit shown in FIG. 2 includes a switching circuit 40 connected between a personal computer (PC) (not shown) and a keyboard (not shown) via the connectors T1, T2, a microprocessor 50 connected to the switching circuit 40 for blocking signals from the keyboard and controlling the operation of the PC instead of the keyboard, a memory 60 connected to the microprocessor 50 for storing data i.e., entries shown in FIG. 5, from the microprocessor 50 during a setting mode. The circuit shown in FIG. 3 includes a parallel/serial conversion circuit 70 having a clock (CK) pin, a PL pin, and a DO pin.

As shown in FIG. 2, the microprocessor 50 has a clock pin (CLK), a data pin (DATA), an LED pin in connection with an LED D1 corresponding to the LED 26 in FIG. 1, an OSC1 pin and an OSC2 pin connected with an oscillating circuit 52 for receiving a clock pulse therefrom, a DIO pin connected to the memory 60, and a CS pin connected to the memory 60. The switching circuit 40 is composed of a transistor 42 having a collector connected to a clock (KD CLK) line of the keyboard and an emitter respectively connected to a clock (PC CLK) line of the PC and a transistor 44 having a collector connected to a data (KD DATA) line of the keyboard and an emitter respectively connected to a data (PC DATA) line of the PC and the data pin (DATA) of the microprocessor 50. The microprocessor 50 also has a control (CTL) pin connected to bases of the transistors 42, 44. The bases of the transistors 42, 44 are also connected to the clock (KD CLK) line of the keyboard via a diode 46. When the CTL pin of the microprocessor 50 is in a high level, the transistors 42, 44 will be turned on, the signals from the KD DATA line and KD CLK line of the keyboard will be transmitted to the microprocessor 50 and the PC, while in case of that the CTL pin of the microprocessor 50 is in a low level, the transistors 42, 44 will be turned off, thus, the signals from the keyboard will be interrupted from transmitting to the PC and the PC will directly receive the signals transmitted from the CLK and DATA pins of the microprocessor 50.

The microprocessor 50 also has a control clock (SK) pin, a data input/output (DIO) pin, two address pins A0, A1, an enable (P/S) pin, a data input (DI) pin, and a set (SET) pin. The P/S pin, the SK pin, and the DI pin of the microprocessor 50 are respectively connected to the PL pin, the CK pin, and the DO pin of the parallel/serial conversion circuit 70. The address pins A0, A1 are connected to the mode selection switch 20. Thus, a player may adjust the mode selection switch 20 to select the default entries for the buttons 11–18 as shown in FIG. 5. The circuit in FIG. 2 further comprises a switch SW3 corresponding to the switch 19 in FIG. 1 connected between a voltage source VCC and a contact C of the mode selection switch 20 such that the switch SW3 will serve as a SHIFT key in a keyboard for expanding the functions of the button 11–17 when the mode selection switch 20 is not in the contact C.

The SET pin of the microprocessor 50 is coupled with the CK, PL pins of the parallel/serial conversion circuit 70 via the direction mode switch 22 and the setting switch 24, respectively. Thus, the direction mode switch 22 may control a plurality of switches in the parallel/serial conversion circuit 70 corresponding to the directional control button 18 in FIG. 1.

When any control button 11–17 or directional control switch 18 is actuated, a serial signal from the parallel/serial conversion circuit 70 will input to the microprocessor 50, the microprocessor 50 will access a corresponding signal from the memory 60 then output a signal to the PC via the data (PC DATA) line in the connector T1.

Figure 4:
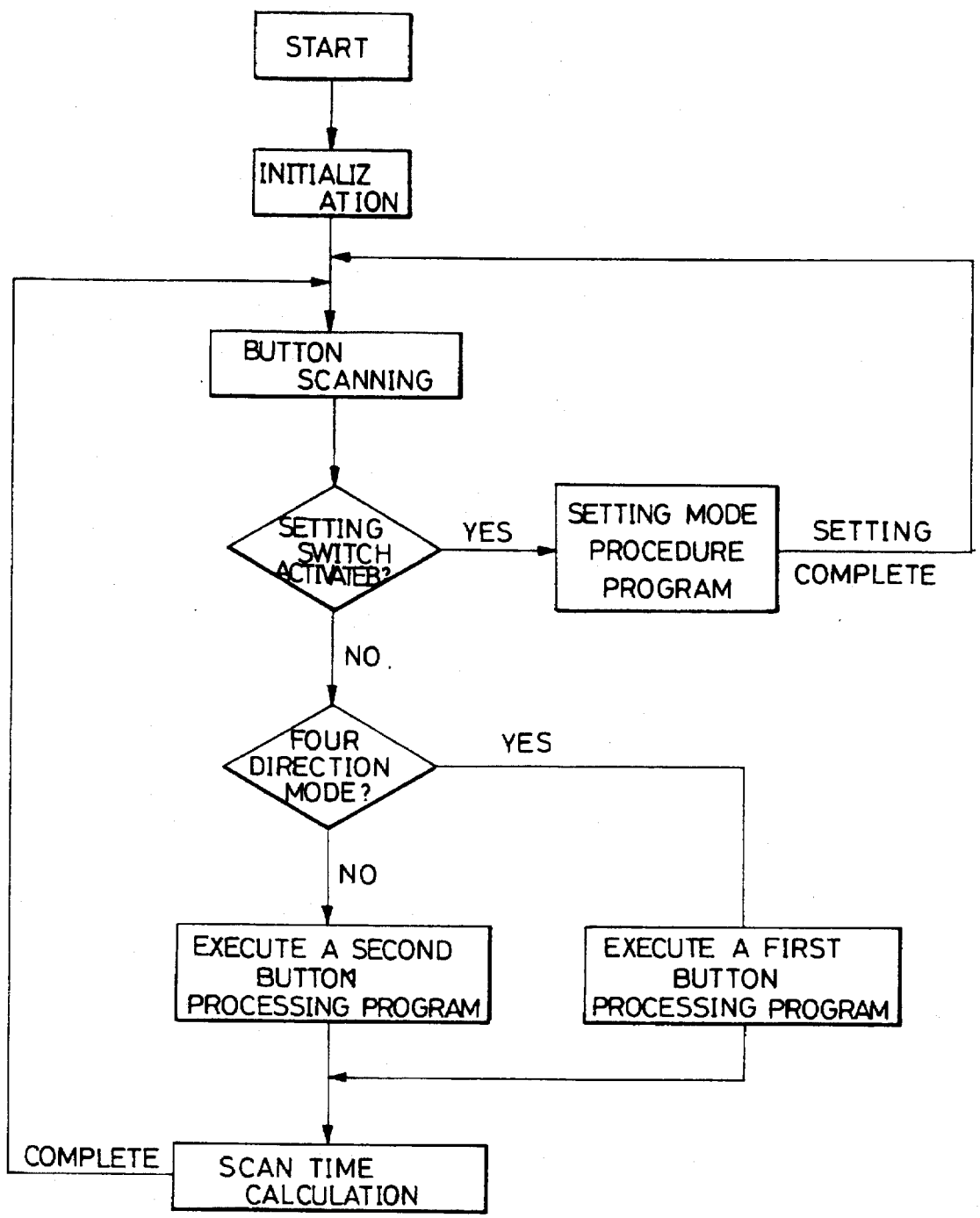
FIG. 4 is a flow chart for an operation of a microprocessor in accordance with the present invention.

Referring to FIG. 4, when the microprocessor 50 is initially powered on, the microprocessor 50 will proceed a button scanning function to detect whether the setting switch 24 is activated, if the switch 24 is turned on, then starts to set the default entries for both of the control buttons 11–17 and the directional control button 18 in cooperation with the switch 20. The entries will temporarily be stored in the memory 60 and return to the button scanning function procedure. In case there is no setting procedure, the entries will be retained even if the power of the circuit is turned off.

If the switch 24 is not turned on, then start to determine whether the switch 18 is operated in a four-direction mode from the ON/OFF status of the direction mode switch 22. If the switch 22 is ON, then the circuit will directly execute a first button processing program. If the switch 22 is OFF, i.e., the switch 18 is operated in the eight-direction mode, the circuit will execute a second button processing program for simulating output signals of the keyboard. A scan time calculation procedure is executed after the completion of the button processing program. When the scan time has expired, the process will return to the button scanning function.

Although the invention has been explained in relation to its preferred embodiment, it is to be understood that many other possible modifications and variations can be made without departing from the spirit and scope of the invention as hereinafter claimed.

I claim:

1. A programmable joypad for playing PC games comprising:

a panel having a plurality of control buttons, a directional button, a switching button, a mode selecting switch, a four/eight direction mode switch, a setting switch; and a control circuit having a microprocessor, a memory, a switching circuit, and a parallel/serial conversion circuit, wherein said microprocessor has a plurality of input and output pins respectively coupled with said control buttons, said directional button, said switching button, and mode selecting switch, and setting switch, a data input pin coupled to the PC, a clock pin coupled to the PC, a set pin coupled to said parallel/serial conversion circuit via the direction mode switch, the setting switch, and a control pin coupled to the switch circuit, which is composed of a first transistor having a collector connected to a clock pin of a keyboard, an emitter connected the clock pin of the microprocessor, and a base respectively connected to the control pin of the microprocessor and a clock line of the keyboard via a diode and a second transistor having a collector connected to the data line of the keyboard, a base connected to the base of the first transistor, and an emitter connected to the data pin of the microprocessor.

2. A programmable joypad as claimed in claim 1 further comprising an oscillating circuit connected with the microprocessor for providing a clock signal thereto.

3. A programmable joypad as claimed in claim 1 further comprising a cable having a male connector and a female connector for respectively connecting to the keyboard and the PC.

4. A programmable joypad as claimed in claim 3 wherein said male connector and the female connectors are respectively connected to a male connector and a female connector of another programmable joypad.

* * * * *